United States Patent
Iyappan Velammal et al.

(10) Patent No.: US 12,461,743 B2
(45) Date of Patent: Nov. 4, 2025

(54) SYSTEM AND METHOD FOR OPTIMIZED GENERATION OF MICROSERVICES

(71) Applicant: Cognizant Technology Solutions India Pvt. Ltd., Chennai (IN)

(72) Inventors: Parasu Pillai Iyappan Velammal, Chennai (IN); Manoj Chakri Shekaran, Bengaluru (IN); Vinitha Yogish Pai, Bengaluru (IN); Sivakumar Ellappan, Chennai (IN); Jeyashree Pandian Duraipandian, Chennai (IN); Pramod Subrayappa, Bangalore (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 307 days.

(21) Appl. No.: 18/112,623

(22) Filed: Feb. 22, 2023

(65) Prior Publication Data
US 2024/0192932 A1 Jun. 13, 2024

(30) Foreign Application Priority Data
Dec. 13, 2022 (IN) .............................. 202241072008

(51) Int. Cl.
G06F 8/76 (2018.01)
G06F 8/30 (2018.01)
G06F 8/40 (2018.01)

(52) U.S. Cl.
CPC ................. G06F 8/76 (2013.01); G06F 8/30 (2013.01); G06F 8/40 (2013.01)

(58) Field of Classification Search
CPC ..... G06F 8/30; G06F 8/36; G06F 8/40; G06F 8/51; G06F 8/76
See application file for complete search history.

(56) References Cited

U.S. PATENT DOCUMENTS

| 9,037,919 B1* | 5/2015 | Robertson ........... G06F 11/3684 714/48 |
| 9,412,070 B2 | 8/2016 | Bostick |

(Continued)

FOREIGN PATENT DOCUMENTS

| CA | 2690081 A1 | 12/2008 |
| CN | 108156022 A | 6/2018 |
| CN | 109978503 A | 7/2019 |

OTHER PUBLICATIONS

Nunes, L.F.A., "From a Monolithic to a Microservices architecture" Technico Lisboa [online], 2018 [retrieved Feb. 22, 2025], Retrieved from Internet: <URL: https://www.academia.edu/download/90942284/77940-Dissertation.pdf>, whole document.*

*Primary Examiner* — Todd Aguilera
(74) *Attorney, Agent, or Firm* — CANTOR COLBURN LLP

(57) ABSTRACT

The present invention provides for a system and a method for generation of domain driven microservices-based architecture from application source codes. A control flow structure is created based on extracted technical rules from an application source code and metadata is extracted by parsing the control flow structure in real-time. A first data associated with a plurality of source entities and corresponding attributes is identified and a second data associated with a plurality of target entities based on an operation type is identified. A third data associated with a plurality of technical data in the application source code is identified based on an action performed by a user via an application corresponding to application source code and data trace between the first data, the second data and the third data is generated. Correlations are established to generate microservices code-based architecture for deployment on a target platform.

24 Claims, 13 Drawing Sheets

(56) References Cited

U.S. PATENT DOCUMENTS

| | | |
|---|---|---|
| 10,162,611 B2 | 12/2018 | Apte |
| 10,162,612 B2* | 12/2018 | Apte ........................ G06F 16/35 |
| 10,606,573 B2 | 3/2020 | Apte |
| 10,628,152 B2 | 4/2020 | Chandramouli |
| 10,691,434 B2 | 6/2020 | Shah |
| 10,789,265 B2 | 9/2020 | Tiwari |
| 10,860,530 B2 | 12/2020 | Raghavan |
| 11,252,249 B2* | 2/2022 | Ogrinz .................... G06F 8/453 |
| 11,327,750 B1* | 5/2022 | Chawda .................... G06F 9/22 |
| 2017/0193437 A1* | 7/2017 | Apte .................... G06Q 10/087 |
| 2019/0334789 A1 | 10/2019 | Roche et al. |
| 2021/0281655 A1* | 9/2021 | Ogrinz .................... H04L 67/01 |

* cited by examiner

| Business Glossary | | | | | |
|---|---|---|---|---|---|
| Program | Entity | Column | Size | Data Type | Business Definition |
| Prgoram-1 | SPACES | SPACES | 7 | ALPHANUM | |
| Prgoram-1 | Entity-1 | Var-1 | 150 | ALPHANUM | |
| Prgoram-1 | Entity-1 | Var-2 | | | |
| Prgoram-1 | Entity-1 | Var-3 | 6 | ALPHANUM | |
| Prgoram-1 | Entity-1 | Var-5 | 1 | ALPHANUM | |
| Prgoram-1 | Entity-1 | Var-6 | 9 | NUMERIC | |

FIG. 3

| Execution step | Source Database | Source Schema | Source Table | Source Column | Statement Type | Transformation Logic | Target Column | Target Table | Target Schema | Target Database |
|---|---|---|---|---|---|---|---|---|---|---|
| STEP-001 | NOT APPLICABLE | NOT APPLICABLE | user_ACCT | BANK_BALANCE | DATA ASSIGNMENT STATEMENT | original_bankbalance = Select bank_balance from user_ACCT where user_ID= userId; | ORIGINAL_BANKBALANCE | NOT APPLICABLE | NOT APPLICABLE | NOT APPLICABLE |
| STEP-001 | NOT APPLICABLE | NOT APPLICABLE | user_ACCT | USER_ID | DATA ASSIGNMENT STATEMENT | original_bankbalance = Select bank_balance from user_ACCT where user_ID= userId; | ORIGINAL_BANKBALANCE | NOT APPLICABLE | NOT APPLICABLE | NOT APPLICABLE |
| STEP-002 | NOT APPLICABLE | NOT APPLICABLE | user_ACCT | ACCT_TYPE | DATA ASSIGNMENT STATEMENT | ACCTType = Select ACCT_type from user_ACCT where user_ID= userId; | ACCTTYPE | NOT APPLICABLE | NOT APPLICABLE | NOT APPLICABLE |
| STEP-002 | NOT APPLICABLE | NOT APPLICABLE | NOT APPLICABLE | USERID | DATA ASSIGNMENT STATEMENT | ACCTType = Select ACCT_type from user_ACCT where user_ID= userId; | UserID | NOT APPLICABLE | NOT APPLICABLE | NOT APPLICABLE |
| STEP-003 | NOT APPLICABLE | NOT APPLICABLE | NOT APPLICABLE | ORIGINAL_BANKBALANCE | IF Condition | Bank_Balance = original_bankbalance, If(ACCTType == senior citizen) ROI = 7%; | BANK_BALANCE | User_TransactionLE | NOT APPLICABLE | NOT APPLICABLE |
| STEP-003 | NOT APPLICABLE | NOT APPLICABLE | NOT APPLICABLE | ACCTTYPE | IF Condition | Bank_Balance = original_bankbalance, If(ACCTType == senior citizen) ROI = 7%; | BANK_BALANCE | User_Transaction | NOT APPLICABLE | NOT APPLICABLE |
| STEP-003 | NOT APPLICABLE | NOT APPLICABLE | NOT APPLICABLE | SENIOR CITIZEN | IF Condition | Bank_Balance = original_bankbalance, If(ACCTType == senior citizen) ROI = 7%; | BANK_BALANCE | User_Transaction | NOT APPLICABLE | NOT APPLICABLE |

FIG. 3B

SYSTEM AND METHOD FOR OPTIMIZED GENERATION OF MICROSERVICES

CROSS REFERENCE TO RELATED APPLICATION

This application is related to and claims the benefit of Indian Patent Application Number 202241072008 filed on Dec. 13, 2022, the contents of which are herein incorporated by reference in their entirety.

FIELD OF THE INVENTION

The present invention relates generally to the field of generation of microservices, and more particularly to a system and a method for generation of optimized domain driven microservices-based architecture from application source codes.

BACKGROUND

Typically, applications have powered success of many enterprises over the years, but are now hampering ability to cost-effectively deliver real-time, customer-centric services. As such, while modernization of applications including legacy applications is clearly needed, progress is constrained by various challenges in skills, methods, technologies, and organizational structure. One major challenge is that of replicating current behaviours that deliver core of enterprise's value in new and modern applications. Furthermore, technical and business rules are not documented reliably that have been embodied over several years within millions of lines of code and has to be painstakingly extracted by experts tracing technical logic for translating it back into business domain. Further, the process of extraction is time consuming and laborious and poses challenges in modernization of applications.

Furthermore, over a period of time, application source code has become fragmented that increases risk of missing critical business rules via manual tracing. However, some available tools may extract technical logic from static code analysis, but offer little support for vital connections to business behaviours. Largely, conventional techniques of extraction from applications are manual, making it prone to incompleteness, ambiguity, and human error, and risking damage from an incomplete match between new capabilities and old capabilities.

In light of the above drawbacks, there is a need for a system and a method to automatically optimize generation of a domain based microservices based architecture. Also, there is a need for generation of a microservices-based architecture from application source codes with generated domain knowledge and minimum human intervention. Further, there is a need to reduce the time taken for generation of microservices-based architecture.

SUMMARY OF THE INVENTION

In various embodiments of the present invention, a system for generation of domain driven microservices-based architecture from application source codes is provided. The system comprises a memory storing program instructions and a processor executing program instructions stored in the memory. The processor is configured to execute a microservices generation engine to create a control flow structure based on technical rules extracted from an application source code and extract metadata by parsing the control flow structure in real-time. The processor is configured to identify a first data associated with a plurality of source entities and corresponding attributes and identify a second data associated with a plurality of target entities based on an operation type. The processor is configured to identify a third data associated with a plurality of technical data in the application source code on the basis of an action performed by a user via an application corresponding to the application source code. The processor is configured to generate a data trace between the first data, the second data and the third data and group the first data, the second data and the third data into a plurality of domains and sub-domains to create grouped domain blocks based on the generated data trace, wherein the grouped domain blocks comprise one or more domain control flow structures. The processor is configured to create boundaries in the form of bounded context associated with the domains and sub-domains and establish correlations between the bounded contexts to generate a microservices code-based architecture for deployment on a target platform.

In various embodiment of the present invention, a method for generation of domain driven microservices-based architecture from application source codes is provided. The method is implemented by a processor executing program instructions stored in a memory. The method comprises creating a control flow structure based on technical rules extracted from an application source code and extracting metadata by parsing the control flow structure in real time. The method comprises identifying a first data associated with a plurality of source entities and corresponding attributes and identifying a second data associated with a plurality of target entities based on an operation type. The method comprises identifying a third data associated with a plurality of technical data in the application source code on the basis of an action performed by a user via an application corresponding to the application source code. The method comprises generating a data trace between the source entities and target entities from the first data, the second data and the third data. The method further comprises grouping the first data, the second data and the third data into a plurality of domains and sub-domains to create grouped domain blocks based on the generated data trace, wherein the grouped domain blocks comprise one or more domain control flow structures. The method comprises creating boundaries in the form of bounded context associated with the domains and sub-domains and establishing correlations between the bounded contexts to generate a microservices code-based architecture.

In various embodiment of the present invention, a computer program product is provided. The computer program product comprises a non-transitory computer-readable medium having computer program code stored thereon, the computer-readable program code comprising instructions that, when executed by a processor, causes the processor to create a control flow structure based on technical rules extracted from an application source code. Metadata is extracted by parsing the control flow structure in real-time and a first data associated with a plurality of source entities and corresponding attributes is identified. A second data associated with a plurality of target entities is identified based on an operation type and a third data associated with a plurality of technical data in the application source code is identified on the basis of an action performed by a user via an application corresponding to the application source code. A data trace is generated between the source entities and the target entities from the first data, the second data and the third data. The first data, the second data and the third data are grouped into a plurality of domains and sub-domains to create grouped domain blocks based on the generated data trace, wherein the grouped domain blocks comprise one or more domain control flow structures. Boundaries are created in the form of bounded context associated with the domains and sub-domains and correlations are established between the bounded contexts to generate a microservices code-based architecture for deployment on a target platform.

BRIEF DESCRIPTION OF THE ACCOMPANYING DRAWINGS

The present invention is described by way of embodiments illustrated in the accompanying drawings wherein:

FIG. 3 illustrates a user interface (UI) via which a glossary of terms associated with an entity is rendered, in accordance with an embodiment of the present invention;

FIG. 3B illustrates an exemplary data trace and business rules associated with each business attribute, in accordance with an embodiment of the present invention;

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
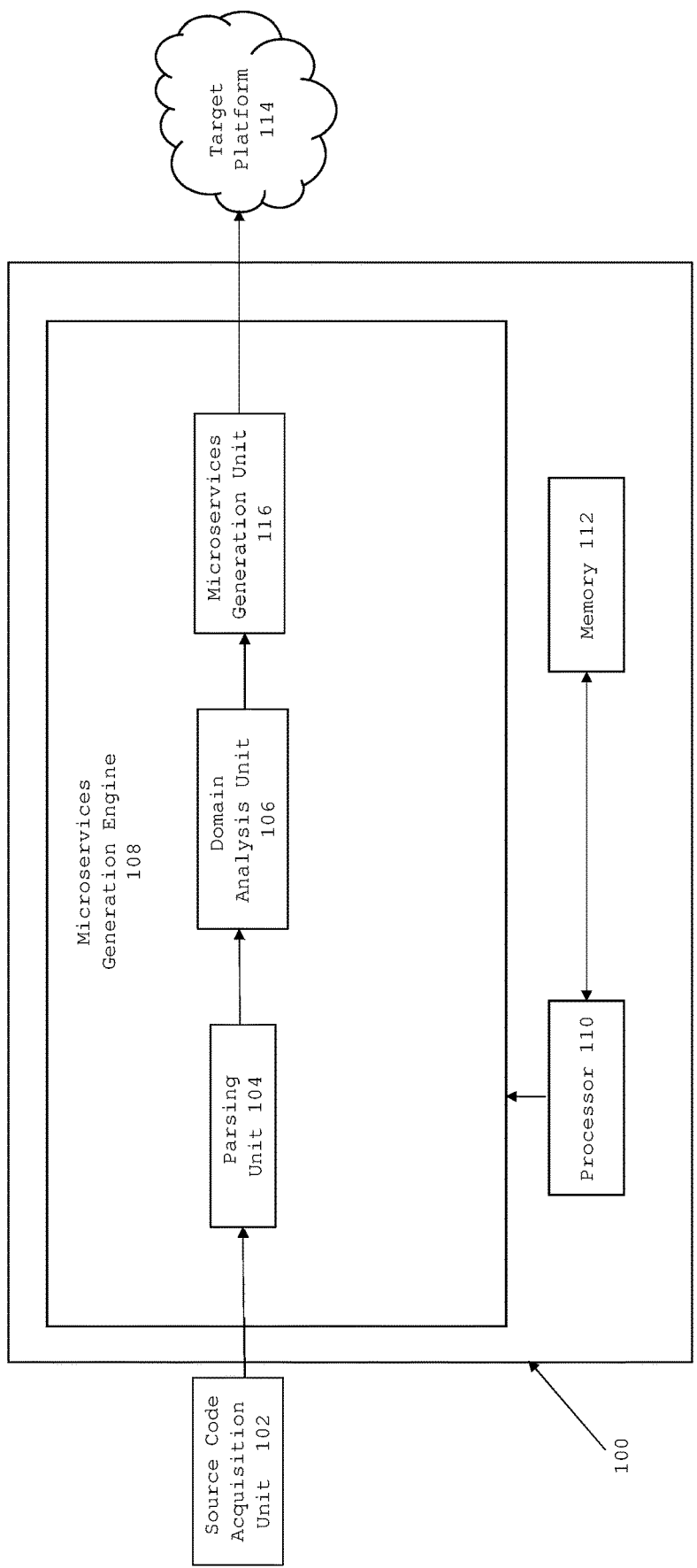
FIG. 1 is a block diagram of a system for generation of a domain driven microservices based architecture from application source codes, in accordance with an embodiment of the present invention.

FIG. 1 is a block diagram of a system for generation of domain driven microservices-based architecture from application source codes, in accordance with an embodiment of the present invention. Referring to FIG. 1, in an embodiment of the present invention, the system 100 comprises a source code acquisition unit 102, a microservices generation engine 108 and a target platform 114. The microservices generation engine 108 comprises a parsing unit 104, a domain analysis unit 106 and a microservices generation unit 116. In another embodiment of the present invention, the source code acquisition unit 102 is configured to receive inputs from a user via a User Interface (UI) (not shown). The components of the system 100 are operated via a processor 110 specifically programmed to execute instructions stored in a memory 112 for executing respective functionalities of the components of the system 100.

In an embodiment of the present invention, the system 100 may be implemented in a cloud computing architecture in which data, applications, services, and other resources are stored and delivered through shared data-centres. In an exemplary embodiment of the present invention, the functionalities of the system 100 are delivered to a user as Software as a Service (Saas) or Platform as a Service (PaaS) over a communication network.

In another embodiment of the present invention, the system 100 may be implemented as a client-server architecture. In an embodiment of the present invention, a client terminal accesses a server hosting the system 100 over a communication network. The client terminals may include but are not limited to a smart phone, a computer, a tablet, microcomputer or any other wired or wireless terminal. The server may be a centralized or a decentralized server. The server may be located on a public/private cloud or locally on a particular premise.

Figure 2:
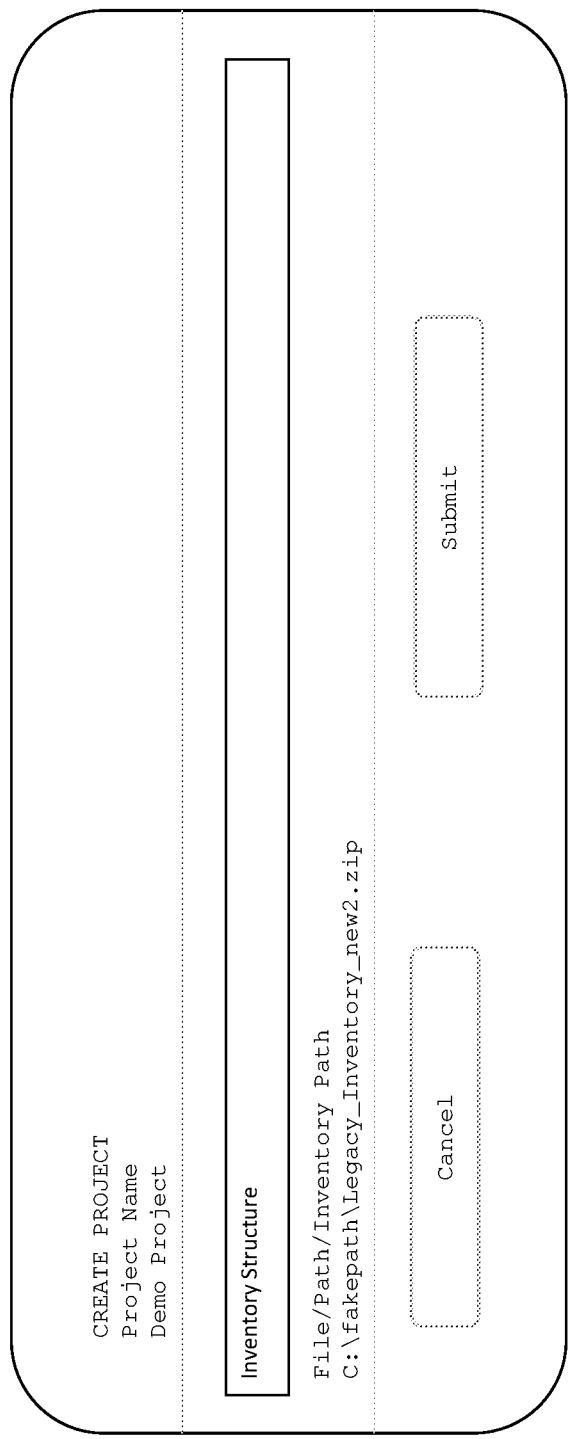
FIG. 2 illustrates a user interface (UI) via which an application source code is uploaded, in accordance with an embodiment of the present invention.

In an embodiment of the present invention, the source code acquisition unit 102 stores application source codes. In an embodiment of the present invention, the application source code comprises details associated with a transaction i.e., events, commands, and policy. In an exemplary embodiment of the present invention, the application source codes may correspond to application source codes of legacy applications (legacy application source codes). In an embodiment of the present invention, the application source codes comprise a plurality of calls and calling functions. In an embodiment of the present invention, the application source codes may be based on languages such as JAVA®, Natural, Cobol®, C++®, C#®, PL/1®, Assembler, Coolgen®, VisualBasic 5 (VB5)®, Job Control Language (JCL). In another embodiment of the present invention, application source codes may be uploaded as a zip file via the UI as illustrated in FIG. 2. In an embodiment of the present invention, the application source codes stored in the source code acquisition unit 102 are transformed to target applications. In an example, the target application is a cloud-based microservice application.

Figure 3A:
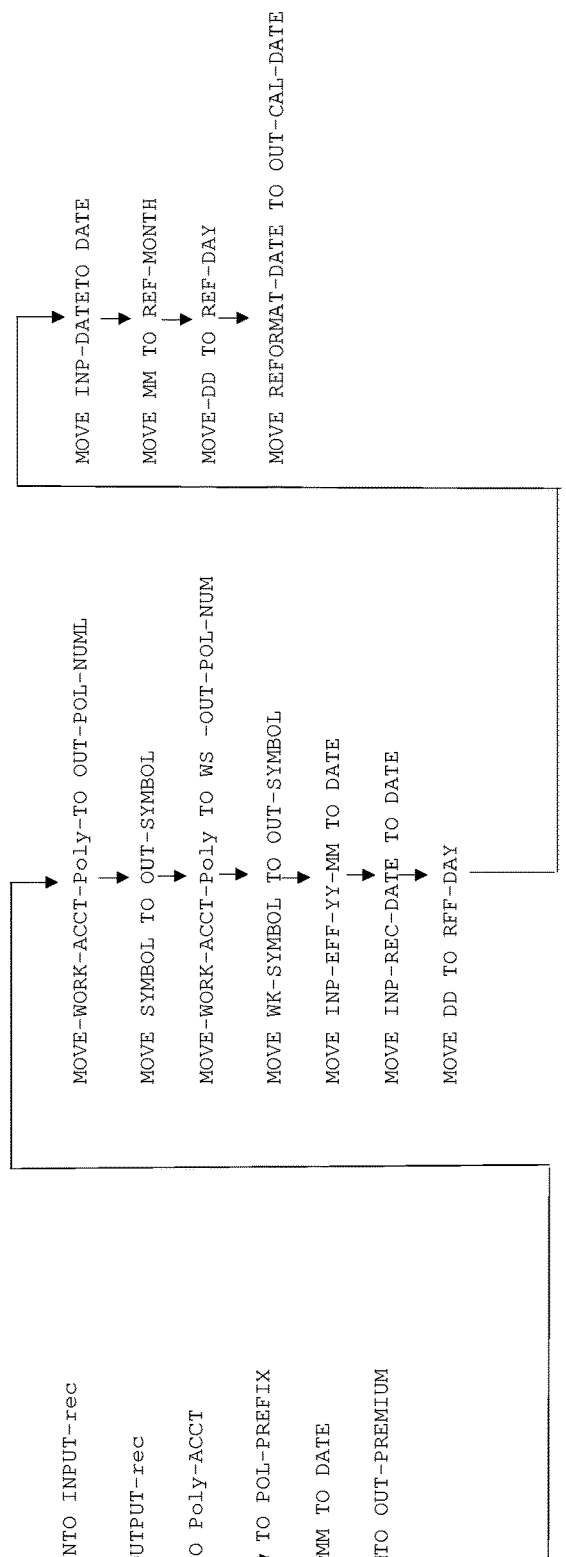
FIG. 3A illustrates one or more technical rules created from the application source code for each transaction, in accordance with an embodiment of the present invention.

In an embodiment of the present invention, the parsing unit 104 is configured to fetch the application source codes from the source code acquisition unit 102 and create a control flow structure from the application source codes by extracting technical rules for an operation type in the application source codes that maps to a desired function. In an embodiment of the present invention, the desired function may be defined in terms of a desired business action. Further, the parsing unit 104 parses the control flow structure in real-time to extract metadata. In an embodiment of the present invention, the parsing unit 104 extracts the metadata to identify a first data from the metadata associated with a plurality of source entities and corresponding attributes and rules. In an embodiment of the present invention, the entities may be defined by the user. The identified first data is stored in a database (not shown). In another embodiment of the present invention, the source entities may be defined by the user via a UI that allows the user to provide a glossary for the entities and assigning business terms to the entities/attributes as illustrated in FIG. 3. In an example, FIG. 3A illustrates the technical rules that are extracted from the application source codes.

In another embodiment of the present invention, the parsing unit 104 is configured to extract the metadata to identify a second data from the metadata associated with a plurality of target entities. In an exemplary embodiment of the present invention, the second data is based on an operation type in the application source code. Examples of operation type include a create operation, an update operation and a delete operation. In an embodiment of the present invention, the identified second data is stored and persisted in a database/file system or any other system.

In yet another embodiment of the present invention, the parsing unit 104 is configured to extract the metadata to identify a third data from the metadata associated with technical data in the application source code. The technical data is automatically identified as events/commands on the basis of an action performed by the user via the application. The technical data aids in identification of actions in terms of the events and commands as well as operation type (i.e., creation, updating, deletion, merge). In an exemplary embodiment of the present invention, the technical data includes a pre-defined condition, and/or a constraint based on the user action. In another exemplary embodiment of the present invention, the technical data includes calculation steps in the application source code. In another exemplary embodiment of the present invention, the technical data includes security related queries. In an embodiment of the present invention, the third data is stored in the database (not shown). In various exemplary embodiments of the present invention, the parsing unit 104 parses the application source code using a technology agnostic technique. In an example, the application source code may be defined as below:

```
userId = 12;
original_bankbalance = Select bank_balance from user_account where user_ID= userId;
accountType = Select account_type from user_account where user_ID= userId;
Bank_Balance = original_bankbalance,
If (accountType == "senior citizen")
{
  ROI = 7%;
}
```

-continued

```
Else if (accountType == "minor")
{
  ROI = 2.5%;
}
Else if (accountType == "girlChildAccount")
{
  ROI = 7.5%;
}
Else
{
  ROI = 3.5%;
}
Bank_Balance = Bank_Balance+(Bank_Balance*ROI)*Total_No_days/365;
Insert into user_account_history values(12, original_bankbalance);
Update user_account set bank_balance = Bank_Balance where userID= "12";
original_bankbalance = Bank_Balance.
```

In the above application source code, an example of first data extraction includes variables 'account type', 'ROI' and 'Total No_days' which are attributes associated with source entity and an example of third data extraction includes 'else if' condition which denotes a rule associated with source entity. Variable 'user_account_history' is associated with target entity and variable 'bank balance' is an attribute associated with target entity, which are examples of the second data extraction.

In another embodiment of the present invention, the parsing unit 104 is configured to determine a data trace between the first data, the second data and the third data. The data trace represents information related to operation, execution in accordance with a sequence, and performance of components of the application source code. In an exemplary embodiment of the present invention, the parsing unit 104 is configured to determine the data trace by detecting run-time parameters of the first data, the second data and the third data. In another exemplary embodiment of the present invention, the data trace is determined by ascertaining source variables associated with the source entity and target variables associated with the target entity. In an exemplary embodiment of the present invention, in the event of a match between the source variable and the target variable along with a sequence of execution, the data trace is retrieved by the parsing unit 104. In another exemplary embodiment of the present invention, in the event of a mismatch between the source variable and the target variable, the data trace is not retrieved by the parsing unit 104. In an example, the data trace and the technical rules for the above example is illustrated in FIG. 3B.

Figure 4:
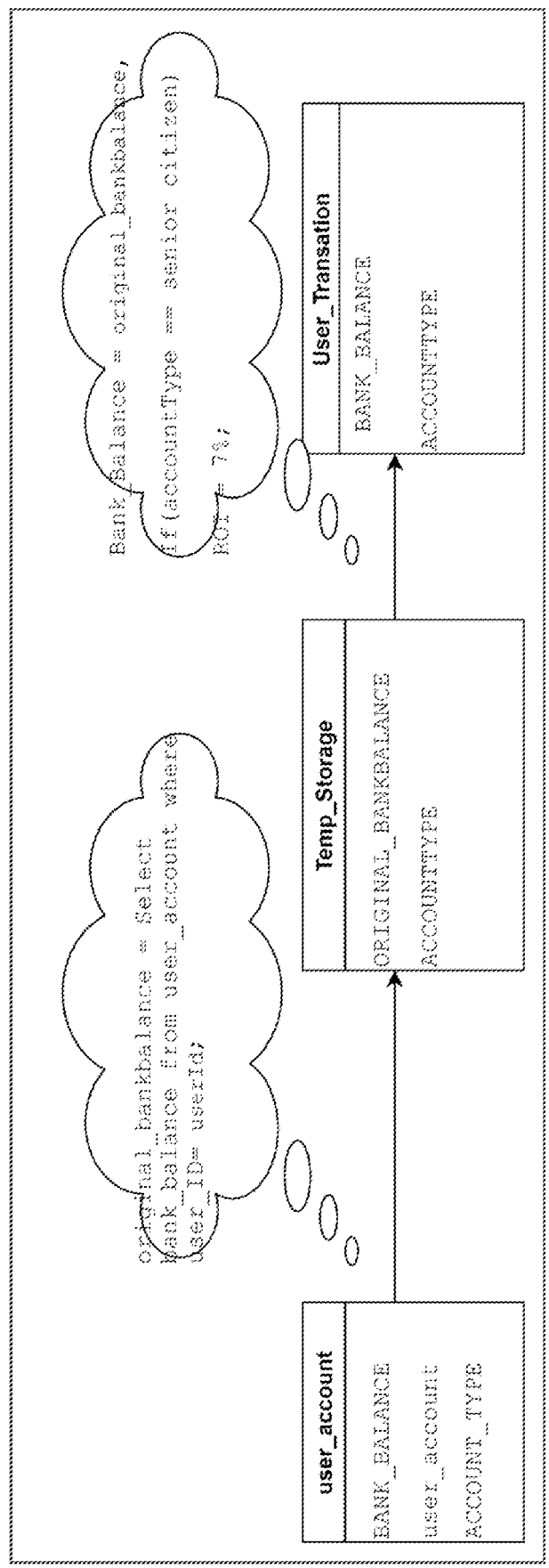
FIG. 4 is a data flow diagram illustrating a generated data trace, in accordance with an embodiment of the present invention.

In the embodiments of the present invention, the parsing unit 104 applies one or more pre-defined rules to identify the first data, second data and third data for determining the data trace of the application source code. In various exemplary embodiments of the present invention, the parsing unit 104 generates the data trace between the source entity and the target entity by correlating data at a domain level of the source entity and target entity. In an example, the generated data trace is rendered via the UI (not shown) as an end-to-end flow structure facilitating traceability from the source entity to the final target entity as illustrated in FIG. 4. In another exemplary embodiment of the present invention, the parsing unit 104 is configured to convert the generated data trace corresponding to the application source code into a data trace model. The data trace model represents a plurality of entities and corresponding attributes, relationship between entities and attributes, policy, command and events for each target entity, transaction name for each entity and domain mapping for each entity. An exemplary data structure of the generated data trace is illustrated herein below:

| Data Trace Structure | |
| --- | --- |
| Execution Step | Statement sequence |
| Loaded Step | Which step the data is coming from I, e rowNo |
| Source Database | Data base name/Source Path |
| Source Schema | Schema dtls/file location details |
| Source Table | Database table/FileName |
| Source Column | Column |
| Operation Type | What kind of opertion Type (CRUD)/Assessment |
| Statement Type | Assignement/Read/Write |
| Transformation Logic | Dervied Fields/logical condition |
| Target Column | Where the data is moving |
| Target Table | Where the data is moving and corresponding entity |
| Target Schema | Where the data is moving and corresponding Schema |
| Target Database | Where the data is moving and corresponding target |
| Line of Code | Statement |

Figure 5:
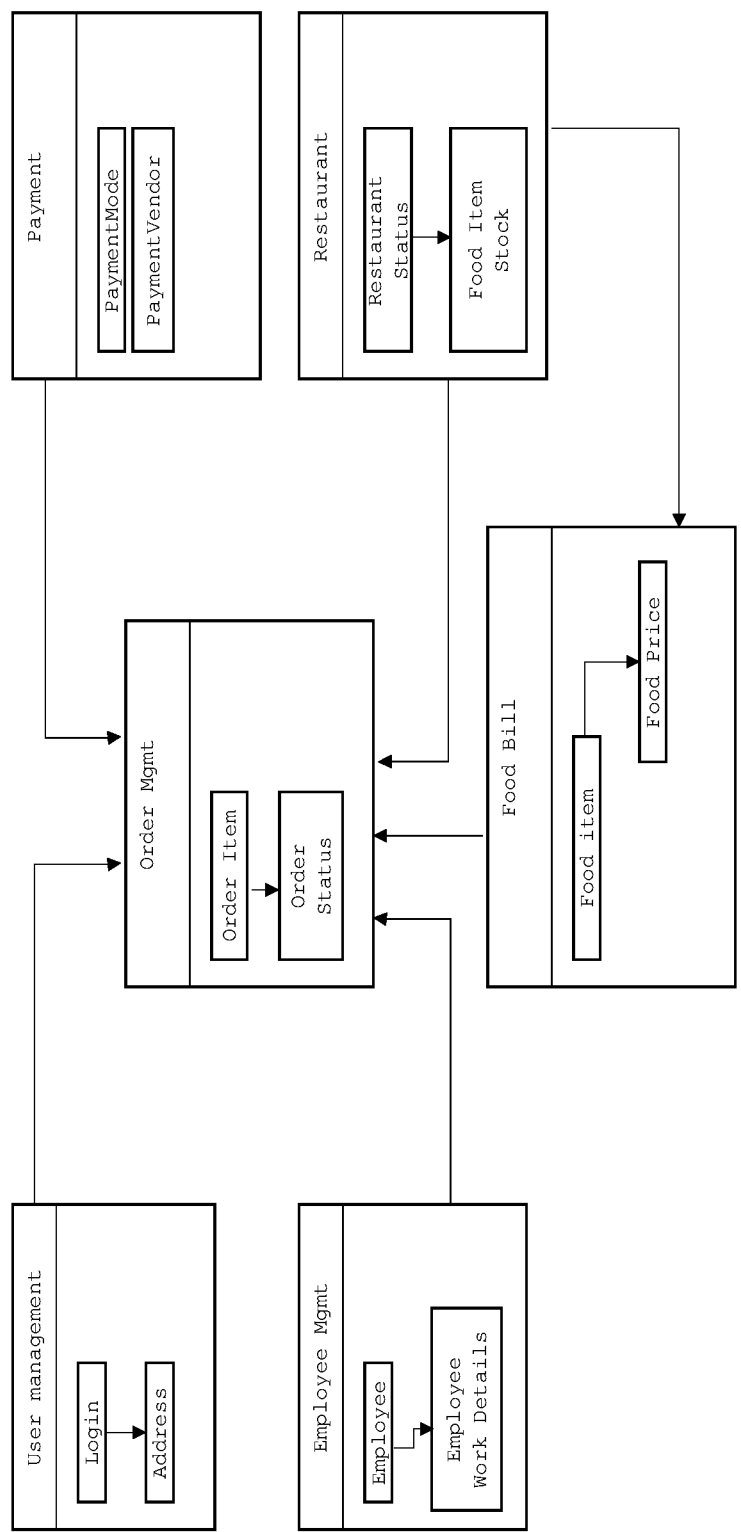
FIG. 5 is a block diagram illustrating grouped domain blocks, in accordance with an embodiment of the present invention.

In an embodiment of the present invention, the domain analysis unit 106 is configured to fetch the first data, the second data and the third data from the parsing unit 104 and establish a relationship between the first data, the second data and the third data across a program flow (e.g., call stack or program involved) based on a domain level analysis using the generated data trace. In an embodiment of the present invention, the domain analysis unit 106 is configured to perform the domain level analysis by identifying application domain related entities and attributes to determine behaviour of the application. In an exemplary embodiment of the present invention, the domain analysis unit 106 is configured to group the first data, the second data and the third data into a plurality of domains and sub-domains in the form of grouped domain blocks using the generated data trace as illustrated in FIG. 5. The grouped domain blocks comprise one or more domain control flow structures. In an embodiment of the present invention, the domain analysis unit 106 performs the grouping by grouping a plurality of technical flows that perform transactions such as create, update, delete on the same targets in the same domain. In another embodiment of the present invention, domain analysis unit 106 performs the grouping by grouping all functionalities and technical flows of the same targets in the same domain.

In an embodiment of the present invention, the microservices generation unit 116 is configured to process the grouped domain blocks to consolidate technical rules and metadata associated with each domain. In an embodiment of the present invention, the microservices generation unit 116 is configured to process the grouped domain block to identify a set of events associated with the domain and sub-domains. Based on the identified set of events, microservices generation unit creates boundaries in the form of bounded context for the domains and sub-domains.

Figure 6:
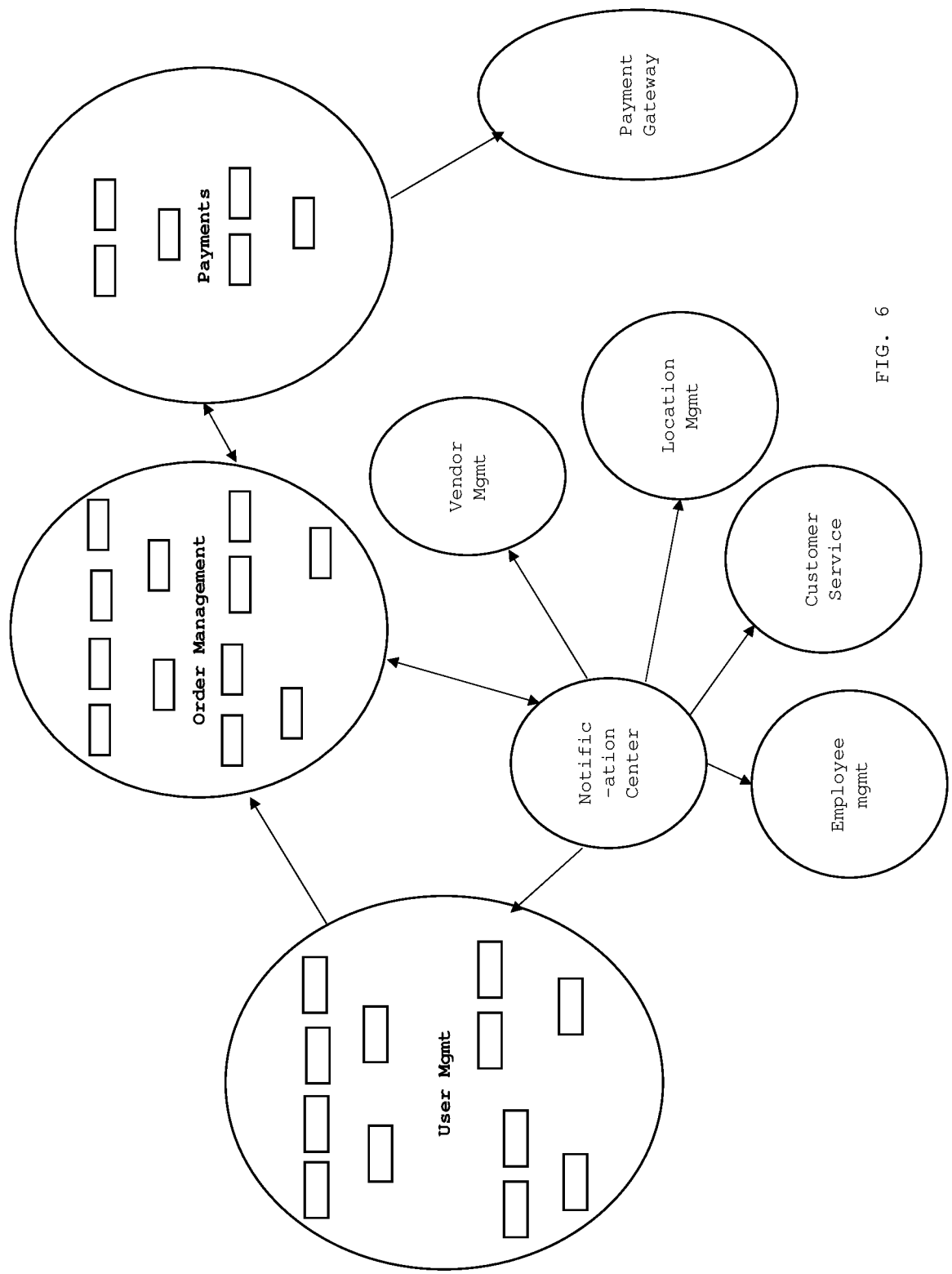
FIG. 6 is a block diagram illustrating a bounded context where all domain functions are mapped onto a specific block, in accordance with an embodiment of the present invention.
Figure 6A:
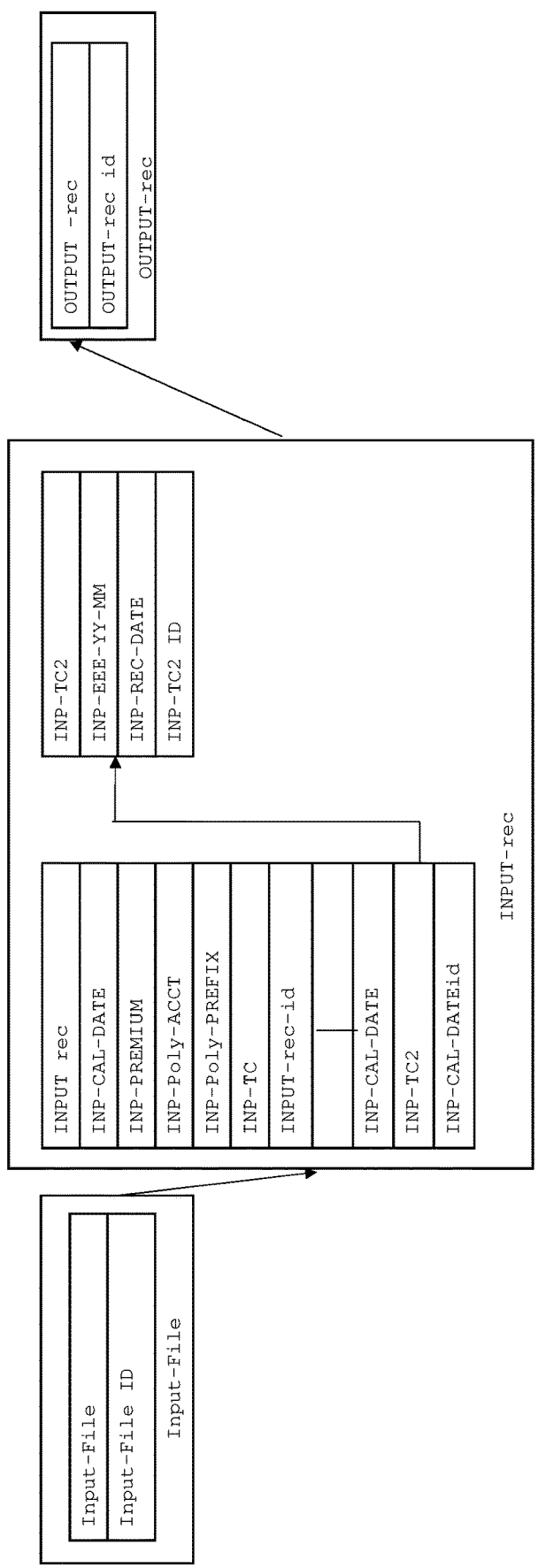
FIG. 6A illustrates mapping of an entity to a functional domain in terms of a domain entity model, in accordance with an embodiment of the present invention.
Figure 6B:
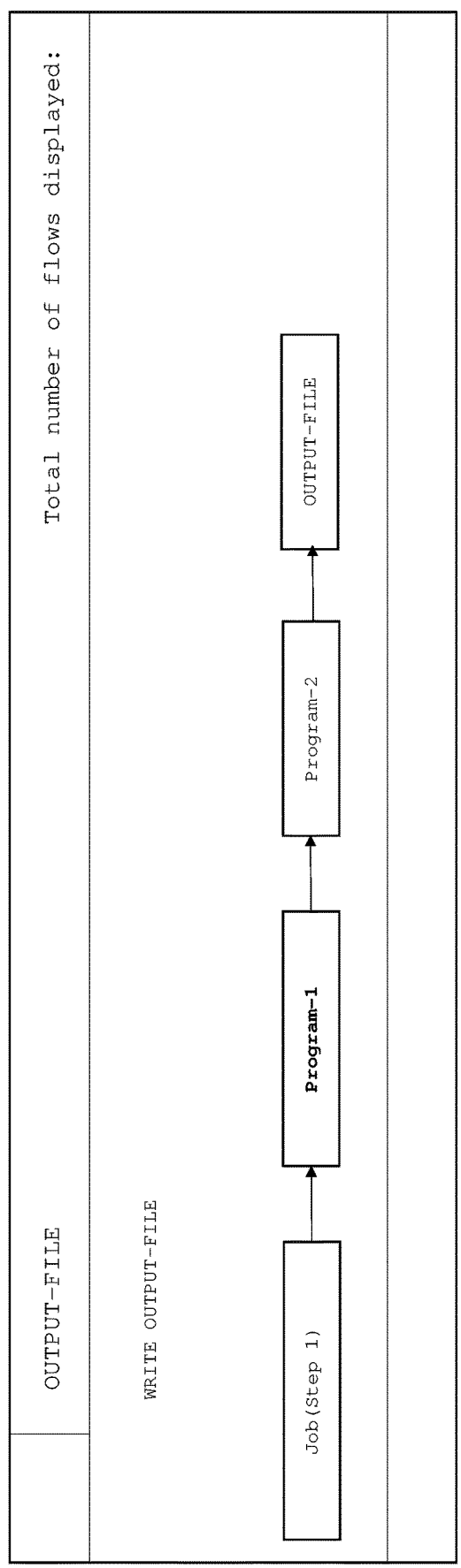
FIG. 6B illustrates an output file corresponding to microservices code-based architecture, in accordance with an embodiment of the present invention.

In an embodiment of the present invention, the microservices generation unit 116 is configured to identify and define correlations between the bounded contexts to generate a microservices code-based architecture corresponding to the domains and sub-domains. In an exemplary embodiment of the present invention, the correlations are established by mapping domain functions into specific domain blocks, as illustrated in FIG. 6. In another embodiment of the present invention, the microservices generation unit 116 generates the microservice code-based architecture based on the established correlations by identifying the domain and sub-domain boundaries corresponding to events, and dependency services associated with the domains and sub-domains including interfaces for dependency services and conditional rules for all domain functions. Further, the microservices code-based architecture is deployed on the target platform 114. In an example, the target platform 114 may be based on Spring Boot®. In another example, the target platform 114 may be based on Maven®. In yet another embodiment of the present invention, the target platform may be a cloud based platform. In an exemplary embodiment of the present invention, the microservices generation unit 116 generates microservice code-based architecture in form of Terraform® code that may be deployed on a cloud-based target platform 114. In an example, FIG. 6A illustrates mapping of the entity to the domain functions in terms of a domain entity model where columns and tables provide a functional definition. In another exemplary embodiment of the present invention, FIG. 6B illustrates an output file corresponding to microservices code-based architecture. In an embodiment of the present invention, the entity may be mapped to a desired/business function.

Figure 6C:
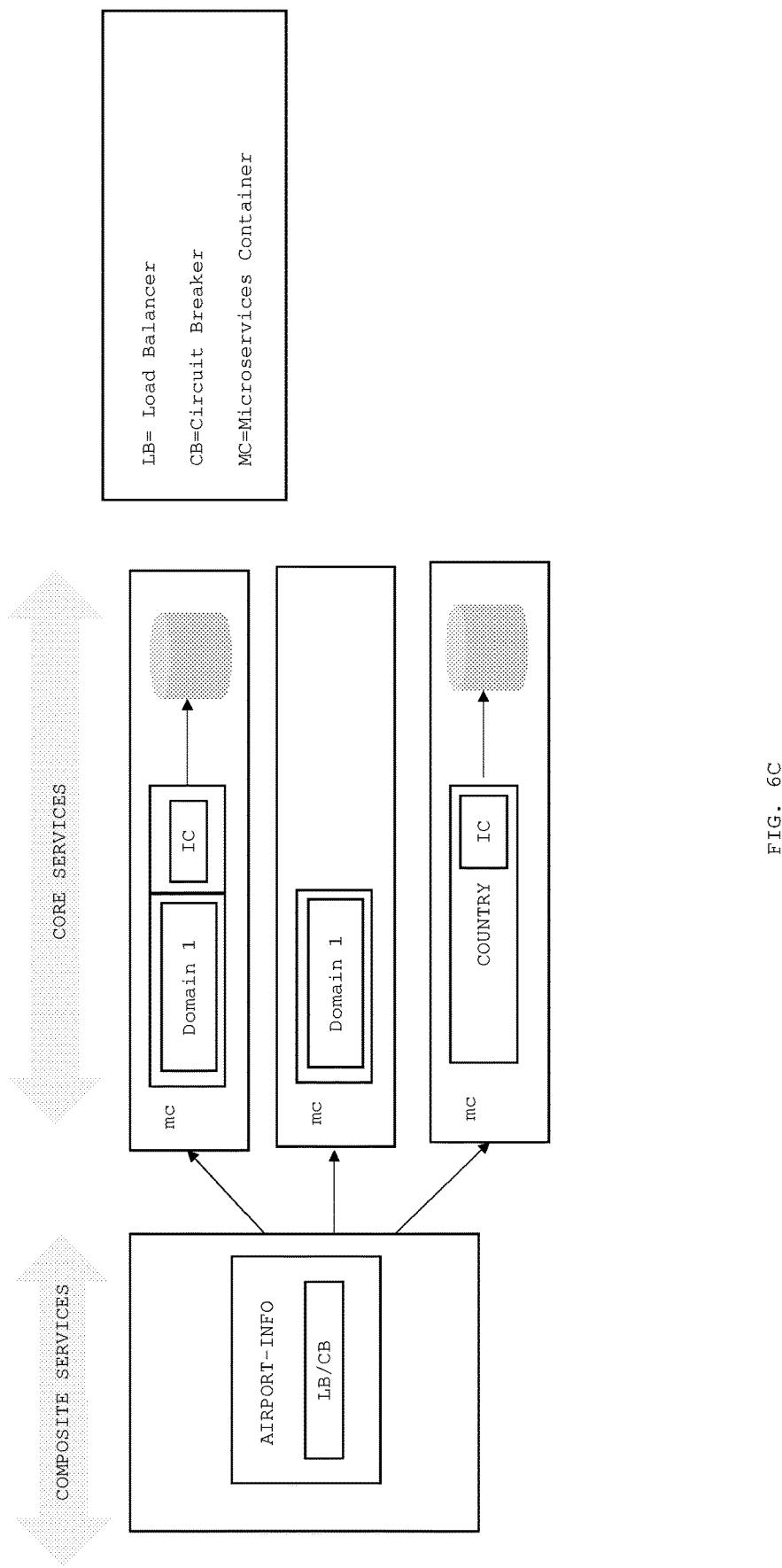
FIG. 6C illustrates a microservices code-based architecture, in accordance with an embodiment of the present invention.

In various embodiments of the present invention, the system 100 is configured to extend capabilities to multiple database technologies. In another embodiment of the present invention, the system 100 is configured to implement rules for document generation and generation of the domain driven microservices code-based architecture that is deployed on the target platform 114 by integrating with a plurality of plugins. In another embodiment of the present invention, the system 100 is configured to derive complexity metrics related to both technical and business complexities. In an example, FIG. 6C illustrates the domain driven microservices code-based architecture that relates to a domain call via a composite service.

Figure 7:
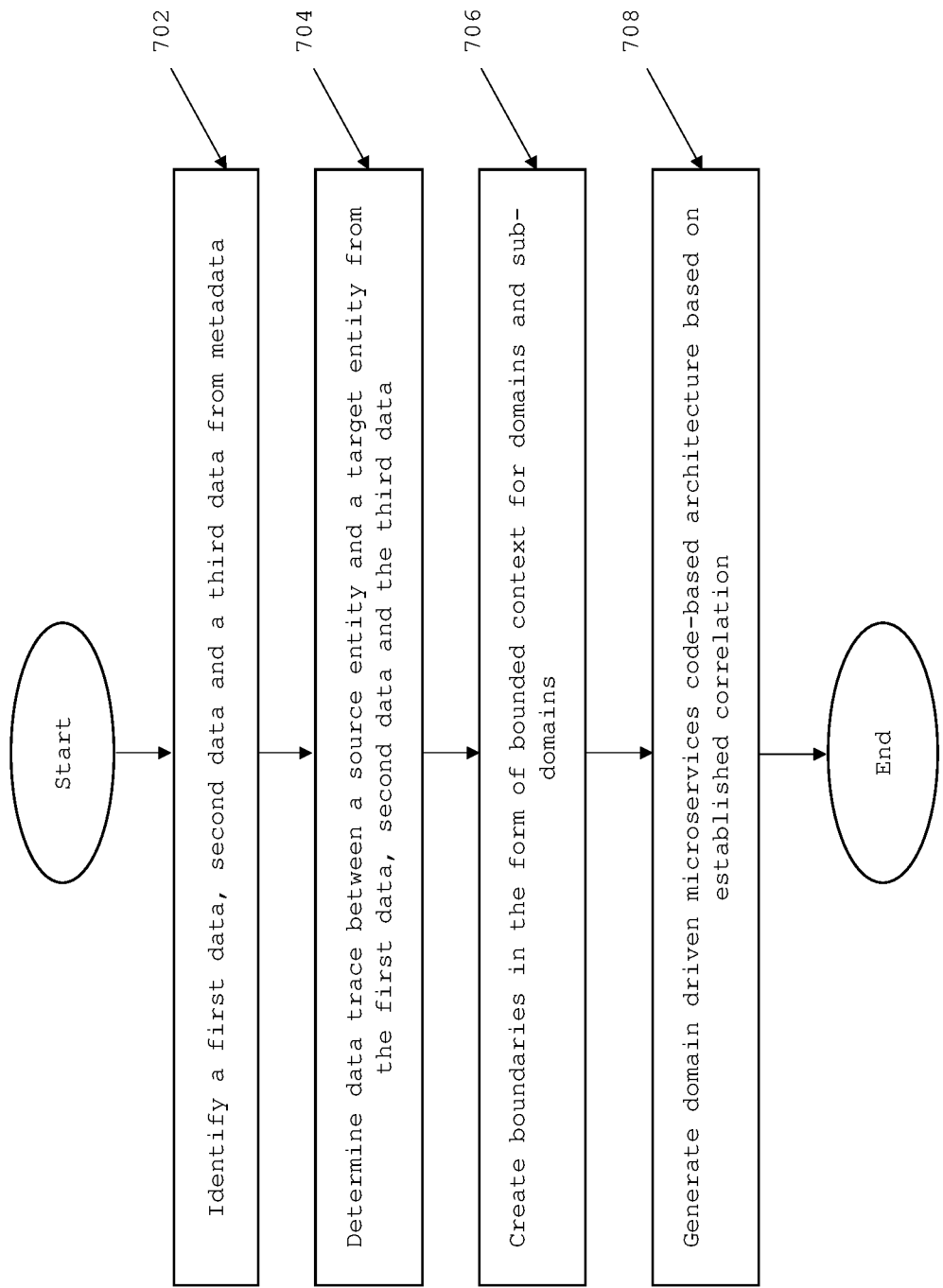
FIG. 7 is a flowchart that illustrates a method for generation of a domain driven microservices-based architecture from application source codes, in accordance with an embodiment of the present invention.

FIG. 7 is a flowchart illustrating a method for generation of a domain driven microservices-based architecture from application source codes, in accordance with an embodiment of the present invention.

At step 702, a first data, a second data and a third data are identified from metadata. In an embodiment of the present invention, source codes corresponding to applications including legacy source codes corresponding to legacy applications are stored. The source codes comprise a plurality of calls and calling functions. In an exemplary embodiment of the present invention, the source codes are based on languages such as JAVAR, Cobol®, C++®, C#®, PL/1®, Natural, Assembler, Coolgen®, VisualBasic 5 (VB5)®, Job Control Language (JCL). In another embodiment of the present invention, application source codes are uploaded as a zip file via the UI as illustrated in FIG. 2. In an embodiment of the present invention, the stored application source codes are transformed to target applications. In an example, the target application is a cloud-based microservice application.

In an embodiment of the present invention, the application source codes are fetched and a control flow structure is created from the application source codes by extracting technical rules for an operation type in the application source codes that maps to a desired function aligned with a domain. In an embodiment of the present invention, the desired function may be defined in terms of the business action. Further, parsing is performed in real-time on the control flow structure to extract metadata. In an embodiment of the present invention, a first data is identified from the metadata associated with plurality of source entities and corresponding attributes. In an embodiment of the present invention, the entities may be defined by the user. The identified first data is stored in a database (not shown). In another embodiment of the present invention, the source entities may be defined by the user via a UI that allows the user to provide glossary for the entities and assigning business terms to the entities/attributes as illustrated in FIG. 3. In an example, FIG. 3A illustrates the technical rules that are extracted from the application source code.

In another embodiment of the present invention, a second data is identified from the metadata associated with a plurality of target entities. In an exemplary embodiment of the present invention, the second data is based on an operation type in the application source codes. Examples of operation type include a create operation, an update operation and a delete operation in the event the target entities are entities in a new application. The identified second data is stored and persisted in a database/file system or any other system.

In yet another embodiment of the present invention, a third data is identified from the metadata associated with the technical data in the application source codes. The technical data is automatically identified as events/commands on the basis of an action performed by the user via the application. The technical data helps in identification of actions in terms of the events and commands as well as operation type (i.e., creation, updating, deletion, merge). In an exemplary embodiment of the present invention, the technical data includes a pre-defined condition, or a constraint based on the user action. In another exemplary embodiment of the present invention, the technical data includes calculation steps in the application source code. In another exemplary embodiment of the present invention, the technical data includes security related queries. In an embodiment of the present invention, the third data is stored in the database. In various exemplary embodiments of the present invention, the application source codes are parsed using a technology agnostic technique.

At step 704, a data trace is determined between the first data, second data and the third data. In an embodiment of the present invention, the data trace represents information related to operation, execution, and performance of components of the application source codes. In an exemplary embodiment of the present invention, the data trace is determined by detecting run-time parameters of the first data, the second data and the third data. In another exemplary embodiment of the present invention, the data trace is determined by ascertaining source variables associated with the source entity and target variables associated with the target entity. In the event of a match between the source variable and the target variable along with sequence of execution, the data trace is retrieved. In the event of a mismatch between the source variable and the target variable, the data trace is not retrieved. In an example, the data trace and the technical rules for the above example is illustrated in FIG. 3B.

In the embodiment of the present invention, one or more pre-defined rules are applied to identify the first data, second data and third data for determining the data trace of the application source codes. In various exemplary embodiments of the present invention, the data trace is determined between the source entity and the target entity by correlating data at a domain level of the source entity and target entity. In an example, the generated data trace is rendered via the UI as an end-to-end flow diagram facilitating traceability from the source entity to the final target entity as illustrated in FIG. 4. In another exemplary embodiment of the present invention, the generated data trace corresponding to the application source code is converted into a data trace model. In an exemplary embodiment of the present invention, the data trace model represents a plurality of entities and corresponding attributes, relationship between entities and attributes, policy, command events and events for each target entity, transaction name for each entity and domain mapping for each entity. An exemplary data structure of the generated data trace is illustrated herein below:

| Data Trace Structure | |
|---|---|
| Execution Step | Statement sequence |
| Loaded Step | Which step the data is coming from I, e rowNo |
| Source Database | Data base name/Source Path |
| Source Schema | Schema dtls/file location details |
| Source Table | Database table/FileName |
| Source Column | Column |
| Operation Type | What kind of opertion Type (CRUD)/Assessment |
| Statement Type | Assignment/Read/Write |
| Transformation Logic | Dervied Fields/logical condition |
| Target Column | Where the data is moving |
| Target Table | Where the data is moving and corresponding entity |
| Target Schema | Where the data is moving and corresponding Schema |
| Target Database | Where the data is moving and corresponding target |
| Line of Code | Statement |

In an embodiment of the present invention, the first data, the second data and the third data are fetched and a relationship is established between the first data, the second data and the third data across a program flow (e.g., call stack or program involved) based on a domain level analysis using the generated data trace. In an embodiment of the present invention, program call chain links are identified between the source entities and the target entities from the data trace to perform the domain level analysis. In an exemplary embodiment of the present invention, based on the domain level analysis application domain related entities and attributes that are critical entities are identified for determining behaviour of the application. In an exemplary embodiment of the present invention, the first data, the second data and the third data are grouped into a plurality of domains and sub-domains in the form of grouped domain blocks using the generated data trace as illustrated in FIG. 5. The grouped domain blocks comprise one or more domain control flow structures. In an embodiment of the present invention, the grouping is performed by grouping a plurality of technical flows that perform transactions such as create, update, delete on the same targets in the same domain. In another embodiment of the present invention, the grouping is performed by grouping all functionalities and technical flows of the same targets in the same domain.

At step 706, a set of events are identified associated with domain and sub domain. The grouped domain blocks are processed to consolidate technical rules and metadata associated with each domain. In an embodiment of the present invention, the grouped domain block is processed to identify set of events associated with the domain and sub-domains. Based on the identified set of events, boundaries are created in the form of bounded context for the domains and sub-domains.

At step 708, domain driven microservices code based architecture is generated based on established correlation. In an embodiment of the present invention, correlations are identified and defined between the bounded contexts to generate a domain based microservices code-based architecture corresponding to the domains and sub-domains. In an exemplary embodiment of the present invention, the correlations are established by mapping domain functions into specific domain blocks, as illustrated in FIG. 6. In another embodiment of the present invention, the microservice code-based architecture is generated based on the established correlations by identifying the domain and sub-domain boundaries corresponding to events, and dependency services associated with the domains and sub-domains including interfaces for dependency services and conditional rules for all domain functions. Further, the microservices code-based architecture is deployed on the target platform 114. In an example, the target platform may be based on Spring Boot®. In another example, the target platform may be based on Maven®. In an exemplary embodiment of the present invention, microservice code-based architecture is generated in form of Teraform® code that may be deployed on a cloud-based target platform. In an example, FIG. 6A illustrates mapping of the entity to the domain functions in terms of a domain entity model where columns and tables provide a functional definition. In another exemplary embodiment of the present invention, FIG. 6B illustrates an output corresponding file to microservices code-based architecture. In an embodiment of the present invention, the entity may be mapped to a desired/business function.

In another embodiment of the present invention, the rules are implemented for document generation and generation of the microservices code-based architecture that is deployed on the target platform by integrating with a plurality of plugins. In another embodiment of the present invention, complexity metrics are derived related to both technical and business complexities. In an example, FIG. 6C illustrates the microservices code-based architecture that relates to a domain call via a composite service.

Advantageously, in an embodiment of the present invention, the system 100 automatically generates code for each business function that is aligned with a domain. Further, data trace of code from source code to target platform is carried out efficiently and easily. The present invention provides for a domain model view that is aligned to a desired business function. Further, the present invention provides for auto identification of memory space based on Non-Functional Requirements (NFR) from users as the microservices architecture is deployed as per the domain and memory required to be reserved for peak time usage as per the domain may be identified and further reserve memory may be allocated as per the peak time usage. Further, time taken for generation of microservices-based architecture is reduced. The system 100 automatically optimizes generation of the domain based microservices architecture. Also, microservices-based architecture is generated from application source codes with domain knowledge and minimum human intervention.

Figure 8:
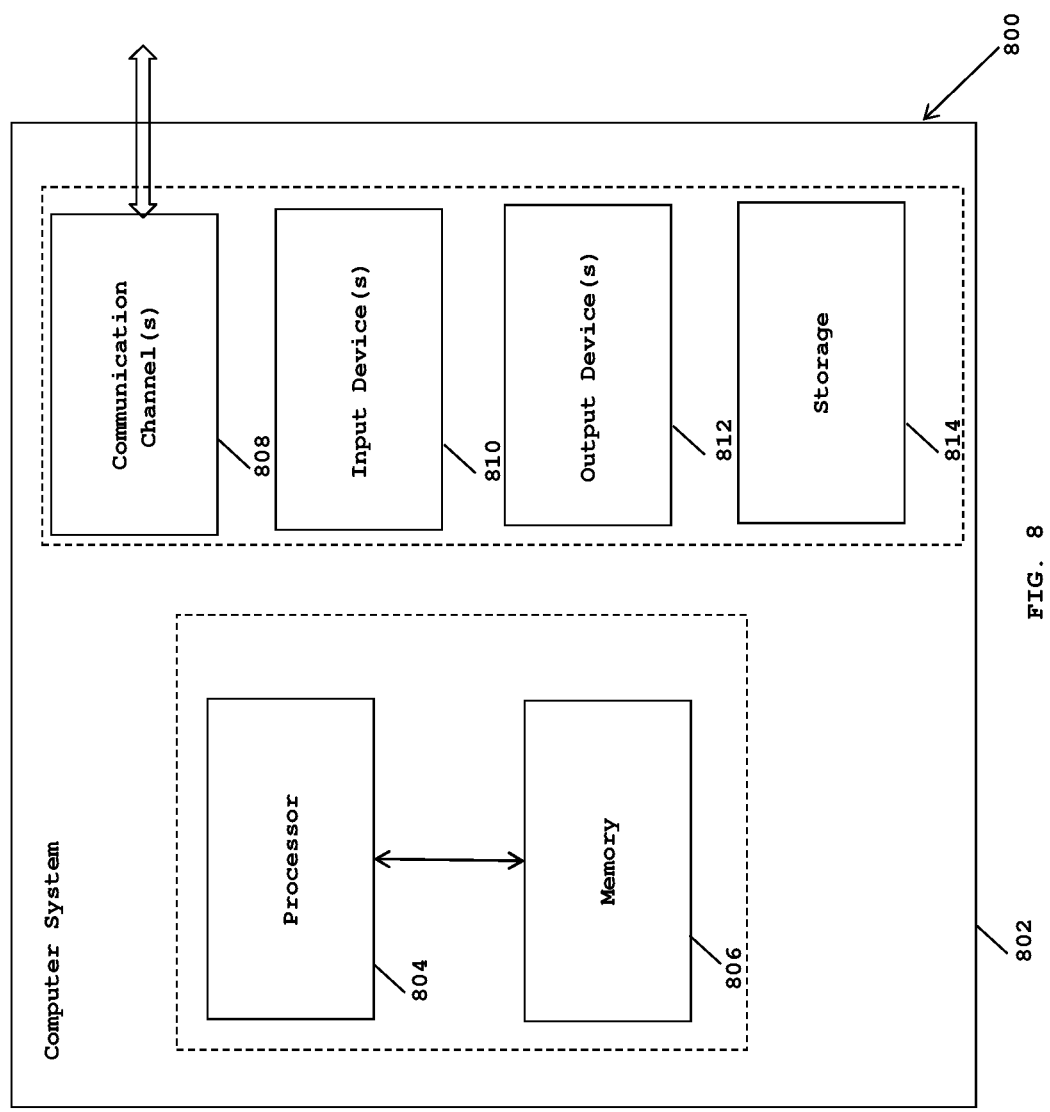
FIG. 8 illustrates an exemplary computer system in which various embodiments of the present invention may be implemented.

FIG. 8 illustrates an exemplary computer system in which various embodiments of the present invention may be implemented. The computer system 802 comprises a processor 804 and a memory 806. The processor 804 executes program instructions and is a real processor. The computer system 802 is not intended to suggest any limitation as to scope of use or functionality of described embodiments. For example, the computer system 802 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 806 may store software for implementing an embodiment of the present invention. The computer system 802 may have additional components. For example, the computer system 802 includes one or more communication channels 808, one or more input devices 810, one or more output devices 812, and storage 814. An interconnection mechanism (not shown) such as a bus, controller, or network, interconnects the components of the computer system 802. In an embodiment of the present invention, operating system software (not shown) provides an operating environment for various software executing in the computer system 802, and manages different functionalities of the components of the computer system 802.

The communication channel (s) 808 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device (s) 810 may include, but not limited to, a keyboard, mouse, pen, joystick, trackball, a voice device, a scanning device, touch screen or any another device that is capable of providing input to the computer system 802. In an embodiment of the present invention, the input device (s) 810 may be a sound card or similar device that accepts audio input in analog or digital form. The output device (s) 812 may include, but not limited to, a User Interface (UI) on CRT or LCD, printer, speaker, CD/DVD writer, or any other device that provides output from the computer system 802.

The storage 814 may include, but not limited to, magnetic disks, magnetic tapes, CD-ROMs, CD-RWs, DVDs, flash drives or any other medium which can be used to store information and can be accessed by the computer system 802. In an embodiment of the present invention, the storage 814 contains program instructions for implementing the described embodiments.

The present invention may suitably be embodied as a computer program product for use with the computer system 802. The method described herein is typically implemented as a computer program product, comprising a set of program instructions which is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel (s) 808. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for generation of domain driven microservices-based architecture from application source codes, wherein the method is implemented by a processor executing program instructions stored in a memory, the method comprising:
    creating a control flow structure based on technical rules extracted from an application source code;
    extracting metadata by parsing the control flow structure in real time;
        identifying a first data associated with a plurality of source entities and corresponding attributes;
        identifying a second data associated with a plurality of target entities based on an operation type;
        identifying a third data associated with a plurality of technical data in the application source code on the basis of an action performed by a user via an application corresponding to the application source code;
        generating a data trace between the source entities and target entities from the first data, the second data and the third data, wherein the data trace is generated by:
    detecting run-time parameters of the first data, the second data and the third data, ascertaining source variables associated with the source entity and target variables associated with the target entity, wherein the data trace is retrieved in the event of a match between the source variables and the target variables;
        grouping the first data, the second data and the third data into a plurality of domains and sub-domains to create grouped domain blocks based on the generated data trace, wherein the grouped domain blocks comprise one or more domain control flow structures;
        creating boundaries in the form of bounded context associated with the domains and sub-domains; and
        establishing correlations between the bounded contexts to generate a microservices code-based architecture code, wherein memory space is automatically identified as per the domain based on non-functional requirements as the microservices architecture code is deployed and reserve memory is allocated as per peak time usage.

2. The method as claimed in claim 1, wherein the application source code comprises details associated with a transaction including events, commands and policy and a plurality of calls and calling functions and, wherein the application source code is uploaded as a zip file via a User Interface (UI).

3. The method as claimed in claim 1, wherein the source and the target entities are defined via a UI that renders a glossary of terms associated with the entities.

4. The method as claimed in claim 1, wherein the technical data includes a pre-defined condition, a constraint based on the user action, calculation steps in the application source code, and security related queries.

5. The method as claimed in claim 1, wherein the data trace is generated between the source entity and the target entity by correlating data at a domain level of the source entity and the target entity.

6. The method as claimed in claim 5, wherein the generated data trace corresponding to the application source code is converted into a data trace model, and wherein the data trace model represents a plurality of entities and corresponding attributes, relationship between entities and attributes, policy, command events and events for each target entity, transaction name for each entity and domain mapping for each entity.

7. The method as claimed in claim 1, wherein the step of generating the data trace comprises establishing a relationship between the first data, the second data and the third data across a program flow based on a domain level analysis, wherein program call chain links are identified between the source entities and the target entities from the data trace to perform the domain level analysis, and wherein application domain related entities and attributes are identified for determining behaviour of the application.

8. The method as claimed in claim 1, wherein the grouping is performed by grouping all functionalities and technical flows of the same targets in the same domain, and wherein the technical flows are grouped to perform transactions, including create, update, delete on same targets in same domain.

9. The method as claimed in claim 1, wherein the grouped domain blocks are processed to consolidate technical rules and metadata associated with each domain and to identify a set of events associated with the domain and sub-domains to create the boundaries.

10. The method as claimed in claim 1, wherein the correlations between the bounded contexts are established by mapping domain functions into specific domain blocks.

11. The method as claimed in claim 10, wherein the microservice code-based architecture code is generated based on the established correlations by identifying the domain and sub-domain boundaries corresponding to events, and dependency services associated with the domains and sub-domains including interfaces for dependency services and conditional rules for all domain functions.

12. A system for generation of domain driven microservices-based architecture from application source codes, the system comprising:
    a memory storing program instructions;
    a processor executing program instructions stored in the memory and configured to execute a microservices generation engine to:
    create a control flow structure based on technical rules extracted from an application source code;
    extract metadata by parsing the control flow structure in real-time;
    identify a first data associated with a plurality of source entities and corresponding attributes;
    identify a second data associated with a plurality of target entities based on an operation type;
    identify a third data associated with a plurality of technical data in the application source code on the basis of an action performed by a user via an application corresponding to the application source code;
    generate a data trace between the first data, the second data and the third data, wherein the data trace is determined by:
    detecting run-time parameters of the first data, the second data and the third data, ascertaining source variables associated with the source entity and target variables associated with the target entity, wherein the data trace is retrieved in the event of a match between the source variables and the target variables;

group the first data, the second data and the third data into a plurality of domains and sub-domains to create grouped domain blocks based on the generated data trace, wherein the grouped domain blocks comprise one or more domain control flow structures;

create boundaries in the form of bounded context associated with the domains and sub-domains; and establish correlations between the bounded contexts to generate a microservices code-based architecture code for deployment on a target platform, wherein memory space is automatically identified as per the domain based on non-functional requirements as the microservices architecture code is deployed and reserve memory is allocated as per peak time usage.

13. The system as claimed in claim 12, wherein the application source code comprises details associated with a transaction including events, commands and policy and a plurality of calls and calling functions, and wherein the application source code is uploaded as a zip file via a User Interface (UI).

14. The system as claimed in claim 12, wherein the source and the target entities are defined via a User Interface (UI) that renders a glossary of terms associated with the entities.

15. The system as claimed in claim 12, wherein the technical data includes a pre-defined condition, a constraint based on a user action, calculation steps in the application source code, and security related queries.

16. The system as claimed in claim 2, wherein the microservices generation engine comprises a parsing unit for generating the data trace between the source entity and the target entity by correlating data at a domain level of the source entity and the target entity.

17. The system as claimed in claim 12, wherein the microservices generation engine comprises a parsing unit for converting the generated data trace corresponding to the application source code into a data trace model, and wherein the data trace model represents a plurality of entities and corresponding attributes, relationship between entities and attributes, policy, command events and events for each target entity, transaction name for each entity and domain mapping for each entity.

18. The system as claimed in claim 12, wherein the microservices generation engine comprises a domain analysis unit configured to establish a relationship between the first data, the second data and the third data across a program flow based on a domain level analysis using the generated data trace, wherein the data grouping unit is configured to identify program call chain links between the source entities and the target entities from the data trace to perform the domain level analysis, and wherein based on the domain level analysis application domain related entities and attributes are identified for determining behaviour of the application.

19. The system as claimed in claim 18, wherein the domain analysis unit is configured to group technical flows that perform transactions, including create, update, delete on same targets in same domain, and performs the grouping into the domains and sub-domains by grouping all functionalities and the technical flows of the same targets in the same domain.

20. The system as claimed in claim 19, wherein the domain analysis unit is configured to process the grouped domain blocks to consolidate technical rules and the metadata associated with each domain, and identifies a set of events associated with the domain and sub-domains to create the boundaries in the form of the bounded context.

21. The system as claimed in claim 12, wherein the microservices generation engine comprises a microservices generation unit configured to establish a correlation between the bounded contexts by mapping domain functions into specific domain blocks.

22. The system as claimed in claim 21, wherein the microservices generation unit generates the microservice code-based architecture code based on the established correlations by identifying the domain and sub-domain boundaries corresponding to events, and dependency services associated with the domains and sub-domains including interfaces for dependency services and conditional rules for all domain functions.

23. The system as claimed in claim 12, wherein the microservices generation unit is configured to implement rules for document generation and generation of microservices by integrating with a plurality of plugins, and wherein the microservices generation engine derives a complexity metrics related to both technical and business complexities.

24. A computer program product comprising:
a non-transitory computer-readable medium having computer program code stored thereon, the computer-readable program code comprising instructions that, when executed by a processor, causes the processor to:
create a control flow structure based on technical rules extracted from an application source code;
extract metadata by parsing the control flow structure in real-time;
identify a first data associated with a plurality of source entities and corresponding attributes;
identify a second data associated with a plurality of target entities based on an operation type;
identify a third data associated with a plurality of technical data in the application source code on the basis of an action performed by a user via an application corresponding to the application source code;
generate a data trace between the source entities and the target entities from the first data, the second data and the third data, wherein the data trace is generated by:
detecting run-time parameters of the first data, the second data and the third data, ascertaining source variables associated with the source entity and target variables associated with the target entity, wherein the data trace is retrieved in the event of a match between the source variables and the target variables;
group the first data, the second data and the third data into a plurality of domains and sub-domains to create grouped domain blocks based on the generated data trace, wherein the grouped domain blocks comprise one or more domain control flow structures;
create boundaries in the form of bounded context associated with the domains and sub-domains; and
establish correlations between the bounded contexts to generate a microservices code-based architecture code for deployment on a target platform, wherein memory space is automatically identified as per the domain based on non-functional requirements as the microservices architecture code is deployed and reserve memory is allocated as per peak time usage.

* * * * *